US011763543B2

(12) United States Patent
Zhang et al.

(10) Patent No.: US 11,763,543 B2
(45) Date of Patent: Sep. 19, 2023

(54) METHOD AND DEVICE FOR IDENTIFYING STATE, ELECTRONIC DEVICE AND COMPUTER-READABLE STORAGE MEDIUM

(71) Applicant: SENSETIME INTERNATIONAL PTE. LTD., Singapore (SG)

(72) Inventors: Wenbin Zhang, Singapore (SG); Yao Zhang, Singapore (SG); Shuai Zhang, Singapore (SG); Shuai Yi, Singapore (SG)

(73) Assignee: Sensetime International PTE. Ltd., Singapore (SG)

( * ) Notice: Subject to any disclaimer, the term of this patent is extended or adjusted under 35 U.S.C. 154(b) by 3 days.

(21) Appl. No.: 17/562,234

(22) Filed: Dec. 27, 2021

(65) Prior Publication Data

US 2022/0122342 A1    Apr. 21, 2022

Related U.S. Application Data

(63) Continuation of application No. PCT/IB2021/062077, filed on Dec. 21, 2021.

(30) Foreign Application Priority Data

Dec. 15, 2021   (SG) ............................ 10202113931V

(51) Int. Cl.
*G06V 10/25*    (2022.01)
*G06V 10/26*    (2022.01)
(Continued)

(52) U.S. Cl.
CPC ............ *G06V 10/273* (2022.01); *G06V 10/25* (2022.01); *G06V 10/431* (2022.01); *G06V 10/48* (2022.01); *G06V 20/64* (2022.01)

(58) Field of Classification Search
CPC .... G06V 10/273; G06V 10/25; G06V 10/431; G06V 20/64; G06V 10/48
See application file for complete search history.

(56) References Cited

U.S. PATENT DOCUMENTS

2013/0285322 A1* 10/2013 Guyer .................. A63F 9/0413
                                                273/146
2017/0039807 A1*  2/2017 Shigeta ................ G07F 17/322
(Continued)

FOREIGN PATENT DOCUMENTS

CN            113508421 A      10/2021

OTHER PUBLICATIONS

International Search Report in the international application No. PCT/IB2021/062077, dated Mar. 24, 2022, 4 pgs.
(Continued)

*Primary Examiner* — Syed Haider
(74) *Attorney, Agent, or Firm* — Cooper Legal Group, LLC

(57) ABSTRACT

A method and device for identifying a state, electronic device and computer-readable storage medium are provided. The method includes: acquiring a to-be-detected image for a specific scene and determining a region of interest in the to-be-detected image; the region of interest being a region obtained by subtracting an occlusion range of the storage container in a closed state from an occlusion range in an open state; determining a positional relation between the region of interest and specific object regions where the specific objects are positioned in the to-be-detected image; determining at least one value based on values of pixels in the region of interest, when the positional relation represents that there is no specific object region partially overlapping the region of interest; and determining whether the storage
(Continued)

container is in an open state or closed state based on the at least one value and a preset value range.

19 Claims, 10 Drawing Sheets

(51) Int. Cl.
*G06V 10/48* (2022.01)
*G06V 10/42* (2022.01)
*G06V 20/64* (2022.01)

(56) References Cited

U.S. PATENT DOCUMENTS

| | | |
|---|---|---|
| 2018/0053377 A1* | 2/2018 | Shigeta ............... G07F 17/3241 |
| 2018/0068525 A1 | 3/2018 | Shigeta |
| 2018/0114406 A1 | 4/2018 | Shigeta |
| 2019/0220682 A1* | 7/2019 | Schimmel ............... G06V 20/52 |
| 2020/0053276 A1* | 2/2020 | Kim ..................... H04N 5/2621 |
| 2020/0388109 A1* | 12/2020 | Shigeta ................. G06F 18/214 |
| 2020/0394803 A1* | 12/2020 | Liu ......................... G06T 7/194 |
| 2021/0233355 A1 | 7/2021 | Shigeta |
| 2021/0233356 A1 | 7/2021 | Shigeta |
| 2021/0335082 A1 | 10/2021 | Shigeta |

OTHER PUBLICATIONS

Written Opinion of the International Search Authority in the international application No. PCT/IB2021/062077, dated Mar. 24, 2022, 6 pgs.

* cited by examiner

METHOD AND DEVICE FOR IDENTIFYING STATE, ELECTRONIC DEVICE AND COMPUTER-READABLE STORAGE MEDIUM

CROSS-REFERENCE TO RELATED APPLICATIONS

This application is a continuation application of International Application No. PCT/IB2021/062077, filed on Dec. 21, 2021, which is based on and claims priority from Singapore Patent Application No. 10202113931V, filed on Dec. 15, 2021. The disclosures of International Application No. PCT/IB2021/062077 and Singapore Patent Application No. 10202113931V are incorporated herein by reference in their entireties.

TECHNICAL FIELD

The disclosure relates to a terminal technology, in particular to a method and device for identifying a state, an electronic device and a computer-readable storage medium.

BACKGROUND

According to some game scenarios, a box configured to store a large number of game coins would be placed on a game table top. In some situations, a game props operator is required to open the box for the next operation. However, according to some intelligent analysis systems for game scenarios, a device is usually required to identify open or closed states of the box to identify a game state, or identify the operation on the game coins by the game props operator to record a relevant state.

SUMMARY

Embodiments of the disclosure provide a method and device for identifying a state, an electronic device and a computer-readable storage medium, and can improve the flexibility of determining open and closed states of a storage container.

The technical schemes of the embodiments of the disclosure are implemented as follows.

An embodiment of the disclosure provides a method for identifying a state, including the following steps: acquiring a to-be-detected image for a specific scene and determining a region of interest in the to-be-detected image; the specific scene including a storage container configured to store specific objects; and the region of interest being a region obtained by subtracting an occlusion range of the storage container in a closed state from an occlusion range of the storage container in an open state; determining a positional relation between the region of interest and specific object regions in which the specific objects are positioned in the to-be-detected image; determining at least one value based on pixel values of pixels in the region of interest, when the positional relation represents that there is no specific object region partially overlapping the region of interest; and each value representing the number of storage spaces in the storage container configured to place the specific objects; and determining whether the storage container is in an open state or a closed state based on the at least one value and a preset value range.

An embodiment of the disclosure provides an electronic device, including: a memory for storing instructions; and a processor, wherein the processor is configured to execute the instructions to: acquire a to-be-detected image for a specific scene; and determine a region of interest in the to-be-detected image, wherein the specific scene comprises a storage container configured to store specific objects, and the region of interest is a region obtained by subtracting an occlusion range of the storage container in a closed state from an occlusion range of the storage container in an open state; to determine a positional relation between the region of interest and specific object regions in which the specific objects are positioned in the to-be-detected image; to determine at least one value based on pixel values of pixels in the region of interest when the positional relation represents that there is no specific object region partially overlapping the region of interest, wherein each value represents a number of storage spaces in the storage container configured to place the specific objects; and to determine whether the storage container is in an open state or a closed state based on the at least one value and a preset value range.

An embodiment of the disclosure provides a computer-readable storage medium configured to store a computer program, which enables a processor to execute and implement a method for identifying a state, the method including: acquiring a to-be-detected image for a specific scene, and determining a region of interest in the to-be-detected image, wherein the specific scene comprises a storage container configured to store specific objects; and the region of interest is a region obtained by subtracting an occlusion range of the storage container in a closed state from an occlusion range of the storage container in an open state; determining a positional relation between the region of interest and specific object regions in which the specific objects are positioned in the to-be-detected image; determining at least one value based on pixel values of pixels in the region of interest when the positional relation represents that there is no specific object region partially overlapping the region of interest, wherein each value represents a number of storage spaces in the storage container configured to place the specific objects; and determining whether the storage container is in an open state or a closed state based on the at least one value and a preset value range.

It should be understood that the foregoing general description and the following detailed description are merely illustrative and are not intended to limit the disclosure.

BRIEF DESCRIPTION OF THE DRAWINGS

The drawings, which are incorporated in and constitute a part of the specification, illustrate embodiments consistent with the disclosure and, together with the specification, are used to illustrate the technical schemes of the disclosure.

DETAILED DESCRIPTION

In order to make the objectives, technical schemes and advantages of the disclosure to be understood clearly, the disclosure will be described in further detail below with reference to the drawings, and the described embodiments are not intended to limit the disclosure. All other embodiments derived without inventive efforts by those of ordinary skill in the art should fall within the scope of the disclosure.

An embodiment of the disclosure provides a method for identifying a state, which can improve the flexibility of determining open and closed states of a storage container. The method for identifying the state according to the embodiment of the disclosure may be applied to an electronic device. Illustratively, the method may be applied to various types of user terminals (hereinafter referred to as terminals) such as AR glasses, notebook computers, tablet computers, desktop computers, set-top boxes, mobile devices (such as mobile phones, portable music players, personal digital assistants, special messaging devices, portable game devices), etc., and servers.

Figure 1:
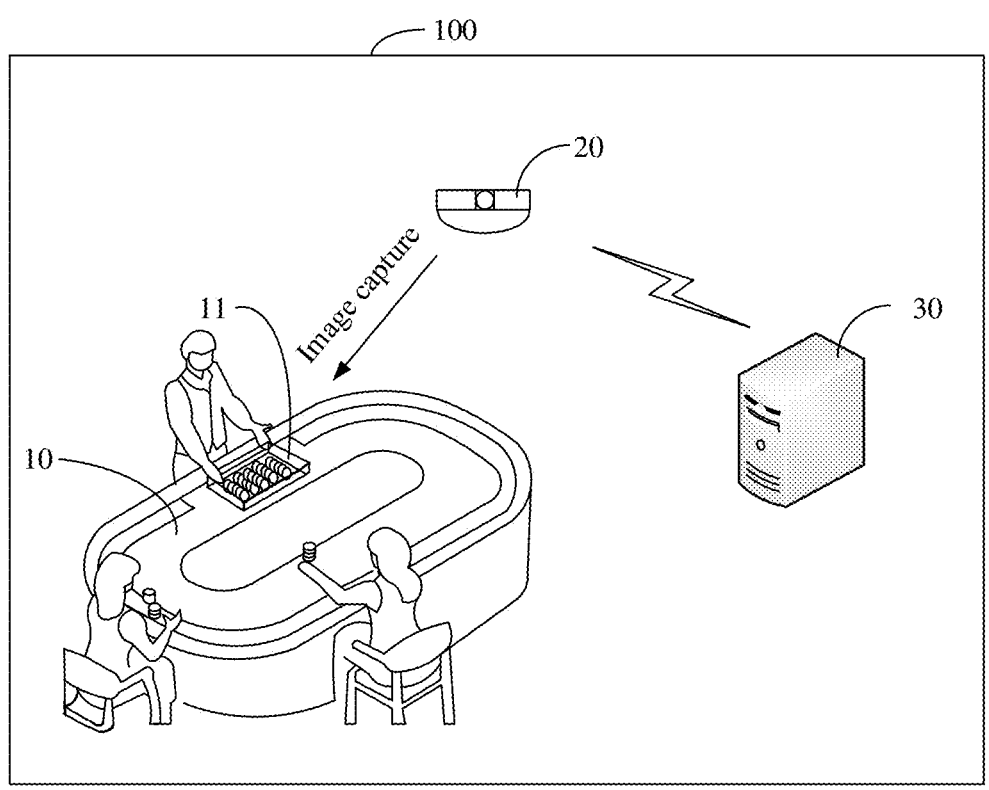
FIG. 1 illustrates a schematic structural diagram of a system for identifying a state according to an embodiment of the disclosure.

FIG. 1 illustrates a schematic structural diagram of a system for identifying a state according to an embodiment of the disclosure. As shown in FIG. 1, the system for identifying the state 100 may include a functional table 10, an image capture device 20 and a device for identifying a state (electronic device) 30 and the image capture device 20 and the device for identifying the state 30 are connected through a network. Illustratively, the functional table 10 may be an intelligent or non-intelligent table such as a game table and the image capture device 20 may be a device such as a camera. A storage container 11 may be placed on the table top of the functional table 10, and the storage container 11 is configured to store specific objects, for example, the storage container 11 may be a game coin storage box, and the specific objects may be game coins. The storage container 11 has two states, i.e., open state and closed state. The image capture device 20 may be mounted on the functional table 10 to capture a table top image of the functional table 10 in real time and transmit the captured table top image to the device for identifying the state 30 to identify the open or closed state of the storage container 11 based on the real-time table top image.

Figure 2:
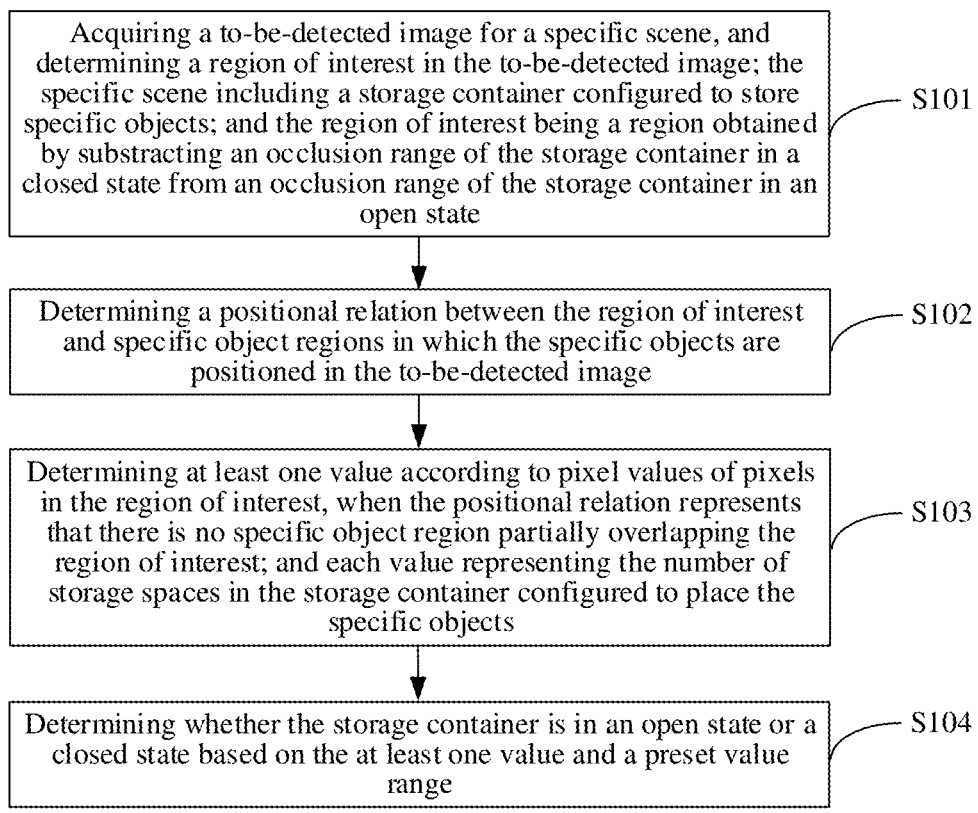
FIG. 2 illustrates an optional schematic flow diagram of a method for identifying a state according to an embodiment of the disclosure.

FIG. 2 illustrates an optional schematic flow diagram of a method for identifying a state according to an embodiment of the disclosure, which will be illustrated with reference to steps shown in FIG. 2.

In step S101, a to-be-detected image for a specific scene is acquired, and a region of interest in the to-be-detected image is determined. Here, the specific scene includes a storage container configured to store specific objects; and the region of interest is a region obtained by subtracting an occlusion range of the storage container in a closed state from an occlusion range of the storage container in an open state.

According to the embodiment of the disclosure, an electronic device may acquire an image for the specific scene including the storage container as the to-be-detected image, and determine the region of interest in the to-be-detected image. The storage container may be configured to store the specific objects, the storage container has two states, i.e., open state and closed state, and the occlusion range of the storage container in the open state is larger than that in the closed state. The region of interest is the corresponding region defined by the occlusion range of the storage container in the open state minus the occlusion range of the storage container in the closed state in the to-be-detected image.

According to some embodiments, a specific scene may be a game scene in which a table top of a game table includes a storage container, or an object selling scene in which a storage container is positioned on a shelf, etc., which is not limited herein.

According to some embodiments, an electronic device may capture an image for a specific scene through an image capture device thereof when the electronic device is provided with the image capture device, or may directly acquire an image for a specific scene captured by an external image capture device from the external image capture device, which is not limited herein.

The to-be-detected image may be an image from top view or side view for the specific scene, which is not limited herein.

The storage container may be a box-shaped container or a case-shaped container, and may further be a container of other shapes, providing that the occlusion range in the open state is larger than that in the closed state, which is not limited herein.

Figure 3A:
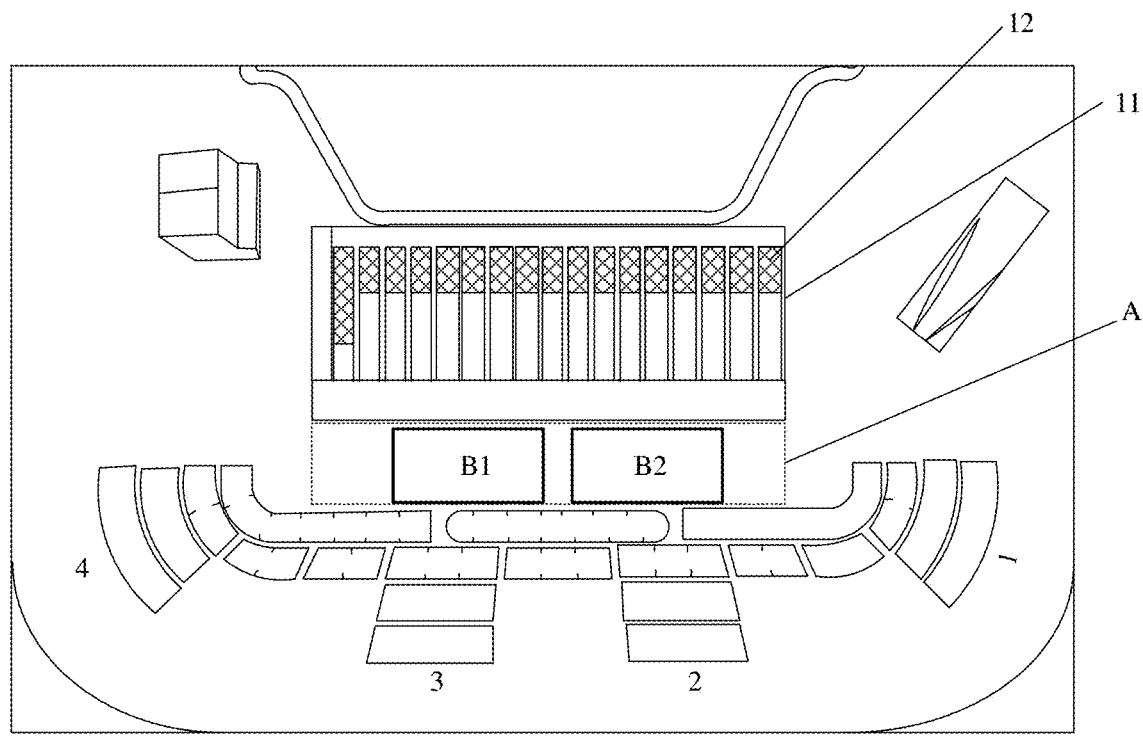
FIG. 3A illustrates a schematic diagram from top view of a game table, a table top of which includes a storage container according to an embodiment of the disclosure.
Figure 3B:
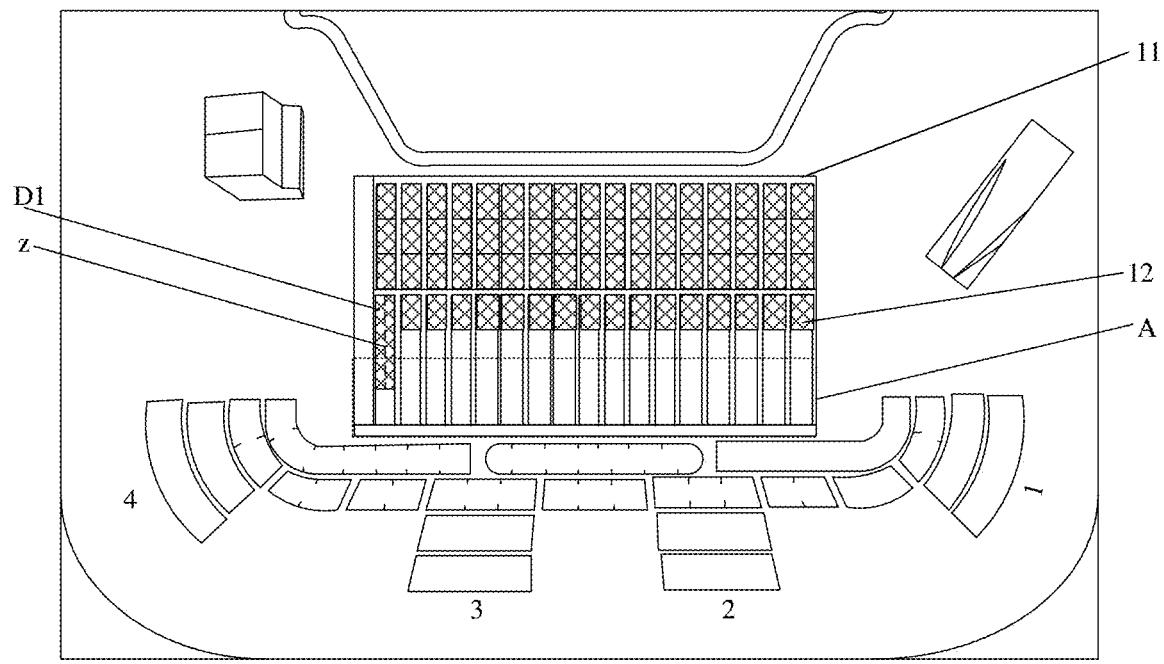
FIG. 3B illustrates another schematic diagram from top view of a game table, a table top of which includes a storage container according to an embodiment of the disclosure.

Illustratively, FIG. 3A and FIG. 3B illustrate diagrams from top view of a game table, a table top of which includes a storage container. The storage container is a double-layer storage box 11, including an upper layer and a lower layer. Each layer is provided with multiple grooves, and each groove is configured to store game coins 12. When the upper layer of the storage box 11 is pushed outward in the horizontal direction of the table top, the storage box 11 is in an open state to expose the lower layer of the storage box, and when the upper layer of the storage box 11 is pushed back in the horizontal direction of the table top, the storage box 11 is in a closed state. The storage box 11 shown in FIG. 3A is in the closed state and the storage box 11 shown in FIG. 3B is in the open state. As shown in FIG. 3A, when the storage box 11 in the closed state, the storage box 11 has a small occlusion range relative to the table top of the game table, and would not occlude regions B1 and B2 on the table top of the game table. As shown in FIG. 3B, when the storage box 11 in the open state, the storage box 11 has a large occlusion range relative to the table top of the game table, and would not only occlude the regions B1 and B2 on the table top of the game table, but also occlude other regions on the table top. A corresponding region is defined by the occlusion range of the storage box 11 in the open state minus the occlusion range of the storage box 11 in the closed state, such as a rectangle region A denoted by a dotted-line box in FIG. 3A or FIG. 3B.

According to the embodiment of the disclosure, a certain number of storage spaces are arranged in the storage container, each storage space is configured to store a portion of the specific objects. For example, a storage space may be a groove of a regular shape, and a certain number of grooves arranged in a certain order are arranged in the storage container. The specific objects are stored by placing the specific objects in the grooves, for example, as shown in FIG. 3A and FIG. 3B.

In step S102, a positional relation between the region of interest and specific object regions in which the specific objects are positioned in the to-be-detected image is determined.

According to the embodiment of the disclosure, the electronic device may determine whether the to-be-detected image includes the specific objects when the to-be-detected image is acquired, and obtain the positional relation between the specific object regions in which the specific objects are positioned and the region of interest according to a determination result.

According to some embodiments, a positional relation may represent that there is no specific object region partially overlapping a region of interest, or may represent that there is a specific object region at least partially overlapping the region of interest.

According to some embodiments, whether a to-be-detected image includes specific objects, and positions of specific object regions, may be determined by image comparison. For example, an image of the specific objects may be stored in advance in an electronic device; when the electronic device acquires a to-be-detected image, the to-be-detected image may be divided into multiple regions, and each region is compared with the pre-stored image of the specific objects to determine whether there is any specific object and determine the positions of the specific object regions in which the specific objects are positioned. According to some embodiments, to improve the accuracy of determination, an electronic device may further adopt a pre-trained target detection module to detect whether each acquired to-be-detected image includes specific objects, and positions of specific object regions in which the specific objects are positioned. For example, the electronic device may adopt an RCNN (Region-based Convolution Neural Networks) model to detect specific objects in each to-be-detected image, and when specific objects are detected, the specific objects are annotated by annotation boxes to determine whether a to-be-detected image includes the specific objects and determine the positions of the regions in which the specific objects are positioned.

In step S103, at least one value is determined according to pixel values of pixels in the region of interest, when the positional relation represents that there is no specific object region partially overlapping the region of interest. Here, each value represents the number of storage spaces in the storage container configured to place the specific objects.

According to the embodiment of the disclosure, the electronic device may determine one or more values according to the pixel values of the pixels in the region of interest, and each value represents the number of the storage spaces in the storage container, when it is determined that the positional relation represents that there is no specific object region partially overlapping the region of interest. Illustratively, the value being 10 represents that the number of the storage spaces in the storage container is 10. It should be noted that, the number of the storage spaces represented by each value is the detected number of storage spaces, and does not represent the actual number of storage spaces in the storage container.

According to some embodiments, an electronic device may perform Fast Fourier Transform on pixel values of pixels in a region of interest to obtain one or more values according to processing results.

In step S104, whether the storage container is in an open state or a closed state is determined based on the at least one value and a preset value range.

According to the embodiment of the disclosure, when the electronic device determines the at least one value, whether the storage container is currently in an open state or a closed state is determined according to the at least one value and the preset value range.

Compared with determining the open and closed states of the storage container by image comparison, the embodiment of the disclosure provides a new mode of detecting the open and closed states of the storage container, and improves the flexibility of determining the open and closed states of the storage container. In addition, due to the fact that the at least one value is obtained by adopting Fast Fourier Transform, and the open and closed states of the storage container are determined according to the at least one value and the preset value range, the calculated at least one value is relatively accurate and the calculation speed is relatively high, so that the efficiency of identifying the state of the storage container and the accuracy of determining the open state or closed state of the storage container are improved.

According to some embodiments, after step S102 described above, an electronic device may further implement step S105.

In step S105, it is determined that the storage container is in an open state when the positional relation represents that there is a specific object region at least partially overlapping the region of interest.

The electronic device may directly determine that the storage container is in an open state when it is determined that the positional relation between the region of interest and the specific object regions represents that there is a specific object region at least partially overlapping the region of interest.

Figure 4:
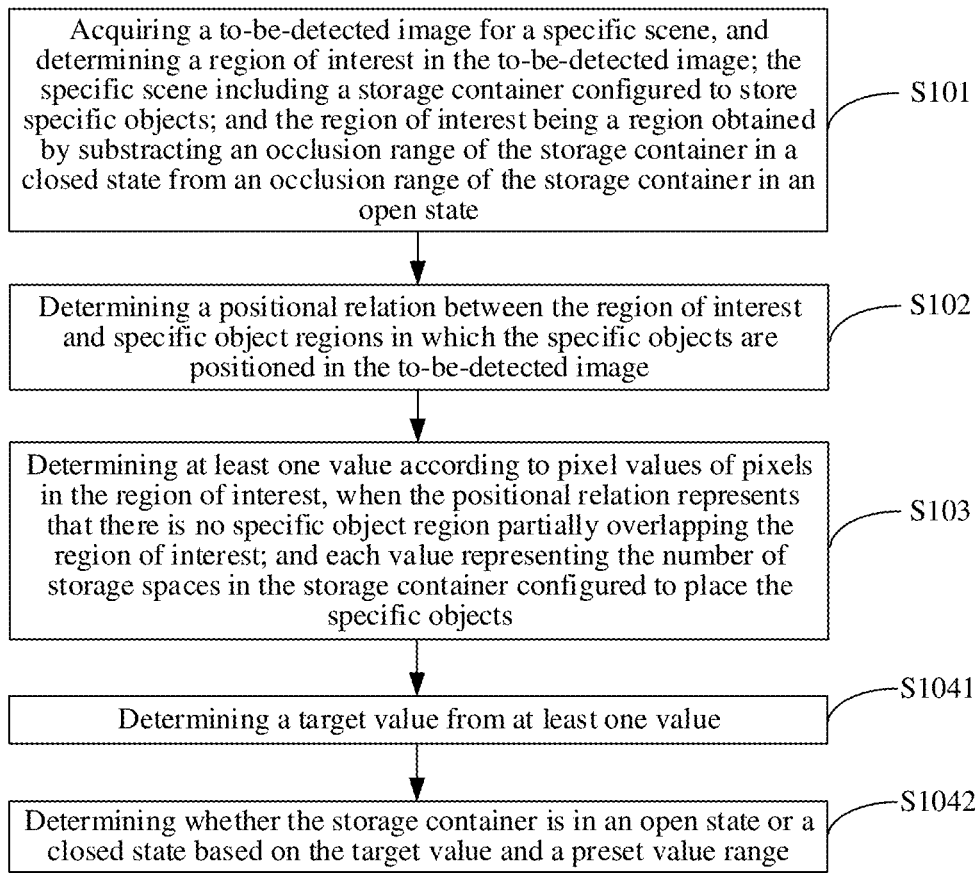
FIG. 4 illustrates an optional schematic flow diagram of a method for identifying a state according to an embodiment of the disclosure.

According to some embodiments, FIG. 4 illustrates an optional schematic flow diagram of a method for identifying a state according to an embodiment of the disclosure. As shown in FIG. 4, the step S104 shown in FIG. 2 may be implemented by steps S1041 to S1042, which will be illustrated with reference to FIG. 4.

In step S1041, a target value is determined from at least one value.

An electronic device may determine the target value from multiple values, for example, an average value, a maximum value, and the like, when multiple values are obtained. Alternatively, the electronic device may directly configure an obtained value as the target value when only the value is obtained.

According to some embodiments, when an electronic device obtains multiple values and a determined target value is an average value, the electronic device may first discard a minimum value and a maximum value from the multiple values, calculate the average value of the rest values, and configure the calculated average value as the target value, therefore, the calculated average value is more accurate and the fault tolerance rate is higher, which is beneficial to improve the accuracy of determining open and closed states of a storage container according to the target value.

In step S1042, it is determined whether the storage container is in an open state or a closed state based on the target value and a preset value range.

When the electronic device determines the target value corresponding to at least one value, the electronic device may determine whether the storage container is in an open state or a closed state according to a relation between the target value and the preset value range.

According to some embodiments, a preset value range may be determined based on the actual number of storage spaces in a storage container. For example, when the storage spaces in the storage container are configured as grooves and 14 grooves are arranged in the storage container, a terminal may set the preset value range to be 10 to 12 or 12 to 14, etc., which is not limited herein.

According to some embodiments, an electronic device may determine that a storage container is in an open state when a target value falls within a preset value range; and the electronic device may determine that the storage container is in a closed state when the target value does not fall within the preset value range.

Figure 5:
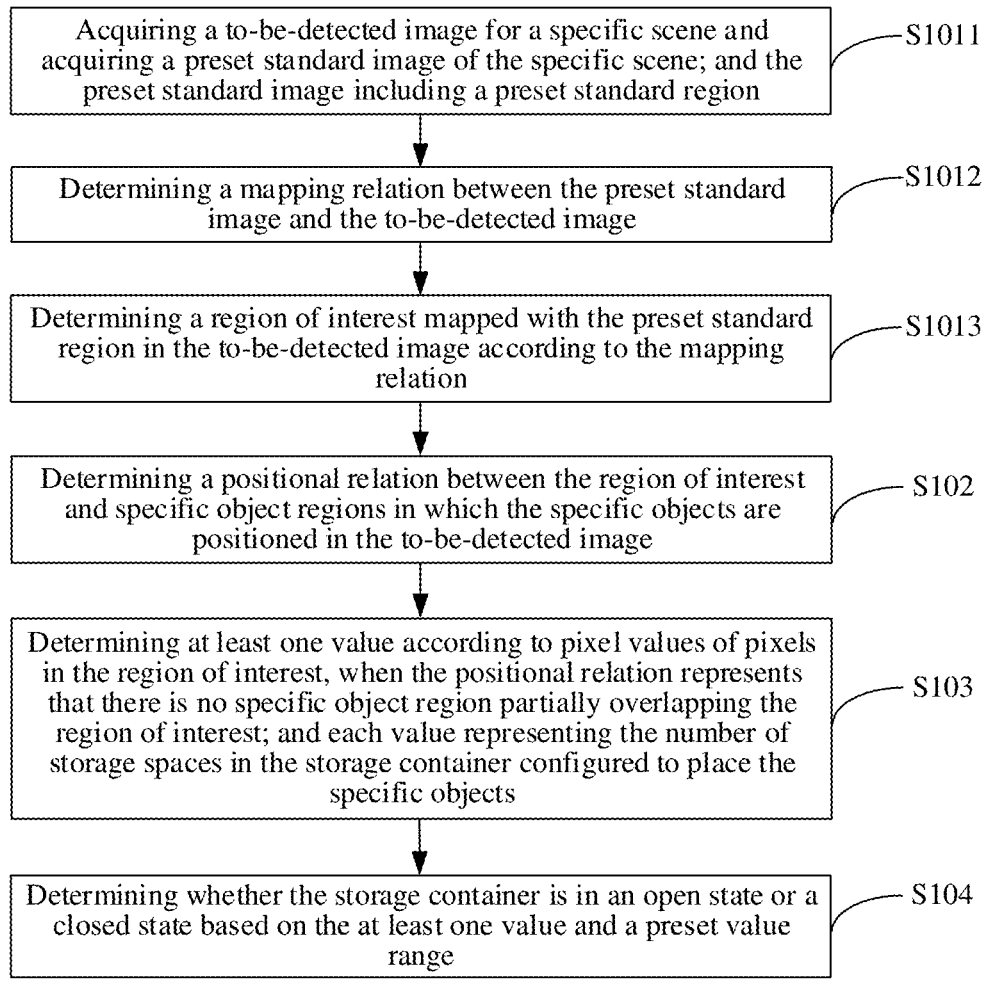
FIG. 5 illustrates an optional schematic flow diagram of a method for identifying a state according to an embodiment of the disclosure.

According to some embodiments, FIG. 5 illustrates an optional schematic flow diagram of a method for identifying a state according to an embodiment of the disclosure. As shown in FIG. 5, the step S101 may be implemented by steps S1011 to S1013, which will be illustrated according to the step S101 shown in FIG. 2 with reference to FIG. 5.

In step S1011, a to-be-detected image for a specific scene is acquired and a preset standard image of the specific scene is acquired. Here, the preset standard image includes a preset standard region.

According to the embodiment of the disclosure, when an electronic device acquires the to-be-detected image for the specific scene, the electronic device may further acquire the preset standard image of the specific scene, and the preset standard image includes the preset standard region; and the preset standard region is a region of interest in the preset standard image.

Illustratively, when an image from top view of the specific scene is acquired, the electronic device may correspondingly acquire a preset standard image from top view; and when an image from side view of the specific scene is acquired, the electronic device may correspondingly acquire a preset standard image from side view.

In step S1012, a mapping relation between the preset standard image and the to-be-detected image is determined.

When the electronic device acquires the preset standard image and the to-be-detected image, the electronic device may determine the mapping relation between the preset standard image and the to-be-detected image.

According to some embodiments, an electronic device may adopt an adaptive method to determine a mapping matrix T between a preset standard image and a to-be-detected image, and configure the mapping matrix T as a mapping relation between the preset standard image and the to-be-detected image.

Herein, the electronic device may adopt a perspective transformation method to determine a perspective transformation matrix between the preset standard image and the to-be-detected image, and configure the perspective transformation matrix as the mapping matrix T.

In step S1013, a region of interest mapped with the preset standard region in the to-be-detected image is determined according to the mapping relation.

When the mapping relation is obtained, the electronic device may adopt the mapping relation to determine the region of interest corresponding to the preset standard region in the to-be-detected image.

According to some embodiments, a preset standard region has position coordinates in a preset standard image, and an electronic device may determine a region coordinate in a to-be-detected image according to the position coordinates of the preset standard region and a mapping matrix T, and a region corresponding to the region coordinate is a region of interest in the to-be-detected image.

Figure 6:
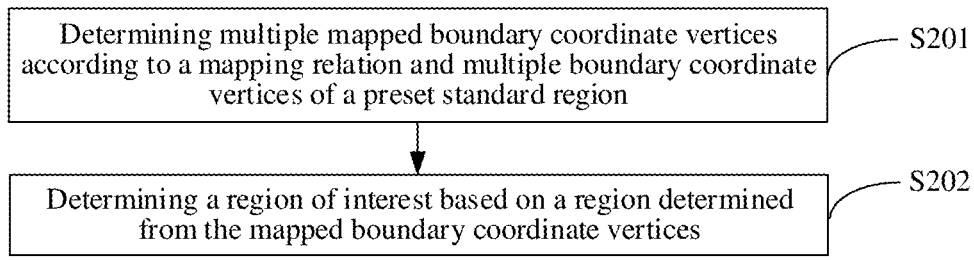
FIG. 6 illustrates an optional schematic flow diagram of a method for identifying a state according to an embodiment of the disclosure.

According to some embodiments, FIG. 6 illustrates an optional schematic flow diagram of a method for identifying a state according to an embodiment of the disclosure. As shown in FIG. 6, the step S1013 shown in FIG. 5 may be implemented by steps S201 to S202, which will be illustrated with reference to FIG. 6.

In step S201, multiple mapped boundary coordinate vertices are determined according to a mapping relation and multiple boundary coordinate vertices of a preset standard region.

In step S202, a region of interest is determined based on a region determined from the mapped boundary coordinate vertices.

According to the embodiment of the disclosure, the position coordinates of the preset standard region may be coordinates of multiple vertices of the preset standard region, therefore, the electronic device may obtain the coordinates of multiple vertices of the region of interest in the to-be-detected image through mapping according to the coordinates of multiple vertices of the preset standard region and the mapping relation, and may determine the region of interest in the to-be-detected image according to the region determined by the obtained coordinates of the vertices in the to-be-detected image.

Illustratively, when the preset standard region is a rectangle region, the coordinates of multiple vertices of the preset standard region may be the coordinates of four vertices of the rectangle, the electronic device may obtain mapped coordinates of the four vertices according to the mapping relation and the coordinates of the four vertices of the preset standard region, and a region determined by the mapped coordinates of the four vertices in the to-be-detected image may be configured as the region of interest.

According to some embodiments of the disclosure, when a preset standard region is a region of a special shape and a region of interest determined by mapped coordinates of vertices is a region of another shape, an electronic device may configure the region of the special shape determined by the mapped coordinates of the vertices as a mapped region of interest. For example, when the preset standard region is a rectangle region and the region of interest determined by the mapped coordinates of the vertices is a parallelogram region, the electronic device may configure a minimum bounding rectangle region determined by the mapped coordinates of the vertices as the mapped region of interest.

Figure 7:
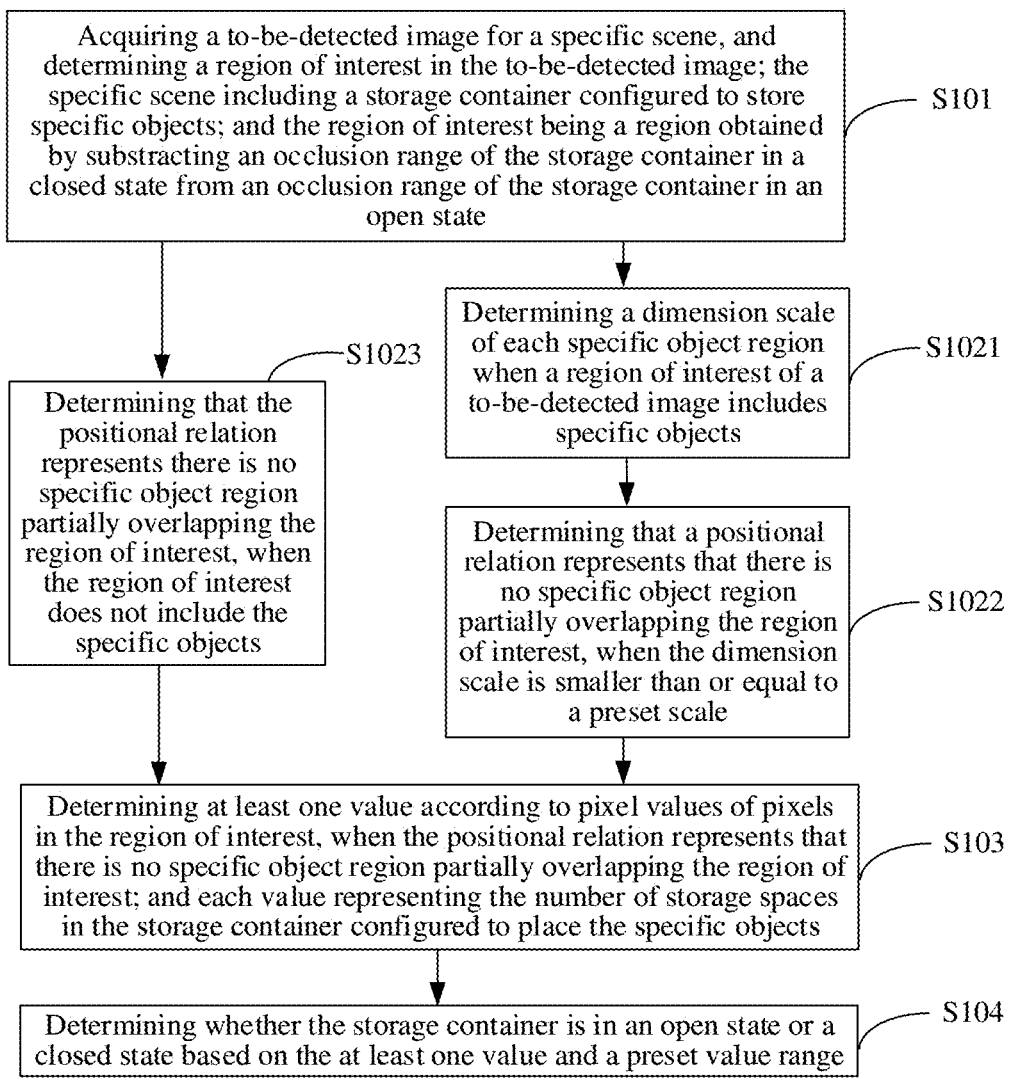
FIG. 7 illustrates an optional schematic flow diagram of a method for identifying a state according to an embodiment of the disclosure.

According to some embodiments, FIG. 7 illustrates an optional schematic flow diagram of a method for identifying a state according to an embodiment of the disclosure. As shown in FIG. 7, the step S102 may be implemented by steps S1021 to S1023, which will be illustrated according to the step S102 shown in FIG. 2 with reference to FIG. 7.

In step S1021, a dimension scale of each specific object region is determined when a region of interest of a to-be-detected image includes specific objects.

In step S1022, it is determined that a positional relation represents that there is no specific object region partially overlapping the region of interest, when the dimension scale is smaller than or equal to a preset scale.

According to the embodiment of the disclosure, when an electronic device determines that the to-be-detected image includes the specific objects, all specific object regions in which the specific objects are positioned may be determined, and the dimension scale of each specific object region is determined. When the determined dimension scale of each specific object regions is smaller than a preset dimension scale, it may be determined that the positional relation between the region of interest and the specific object regions represents that there is no specific object region partially overlapping the region of interest.

According to the embodiment of the disclosure, the region of interest includes the specific objects, which may refer to the fact that the region of interest includes a part of specific objects or all specific objects. For example, if the specific objects are game coins, the region of interest including the game coins may refer to the fact that the region of interest includes some game coins or all game coins.

Figure 8:
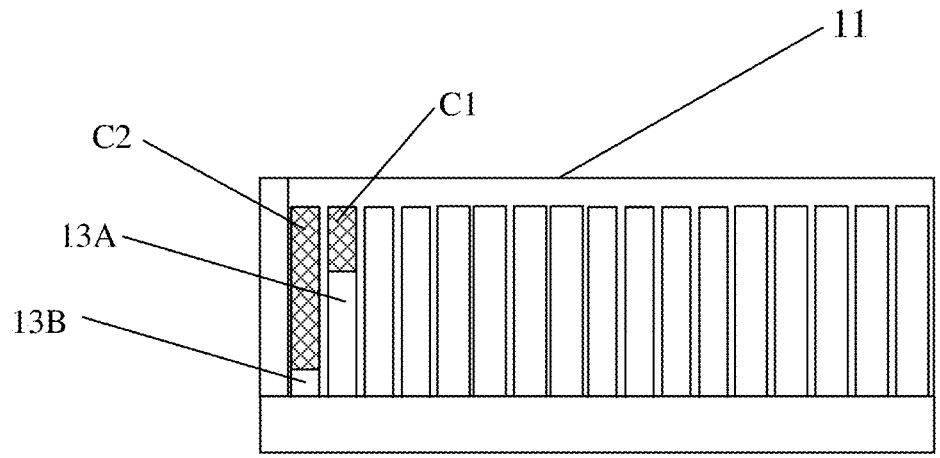
FIG. 8 illustrates a schematic diagram of an image including two specific object regions according to an embodiment of the disclosure.

According to the embodiment of the disclosure, the specific object regions may be regions occupied by the specific objects. Illustratively, when the specific objects are game coins, a specific object region may be a region occupied by a game coin when there is only the game coin, and specific object regions may be regions occupied by a stack of game coins placed upside down, when there are the stack of game coins placed upside down. Illustratively, as shown in FIG. 8, there are two specific object regions, i.e., C1 and C2 respectively. The region C1 is a specific object region, when a small number of game coins are placed upside down in a groove 13A of the storage container 11; and the region C2 is a specific object region when a stack of a large number of game coins are placed upside down in another groove 13B of the storage container 11.

According to some embodiments, an electronic device may calculate an aspect ratio of each specific object region and configure the aspect ratio as a dimension scale of each corresponding specific object region.

According to some embodiments, a preset scale may be dynamically set according to actual needs, for example, the preset scale may be 3:0 or 3:1, etc., when specific objects are game coins, which is not limited herein.

In step S1023, it is determined that the positional relation represents there is no specific object region partially overlapping the region of interest, when the region of interest does not include the specific objects.

When the electronic device determines that there is no specific object in the region of interest, it may be determined that the positional relation between the region of interest and the specific object regions represents that there is no specific object region partially overlapping the region of interest.

According to the embodiment of the disclosure, when the region of interest includes the specific objects, the dimension scale of each specific object region is calculated, and the positional relation between the region of interest and each specific object region is determined according to a relation between each dimension scale and the preset scale, therefore the situation that the state of the storage container is mistakenly determined as the open state when the storage container is not in the open state, but specific objects are placed in the region of interest is eliminated, which is beneficial to improving the accuracy of subsequently determining the open and closed states of the storage container.

Figure 9:
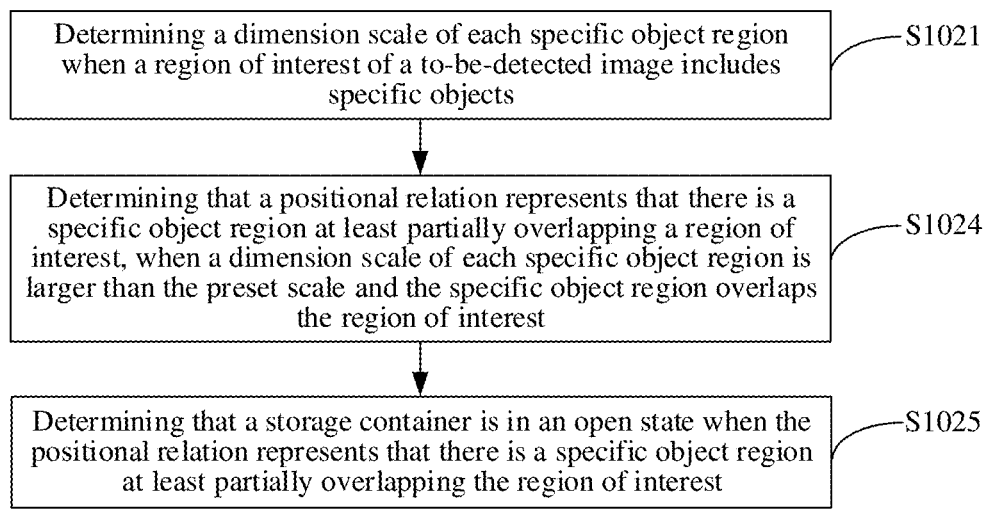
FIG. 9 illustrates an optional schematic flow diagram of a method for identifying a state according to an embodiment of the disclosure.

According to some embodiments, FIG. 9 illustrates an optional schematic flow diagram of a method for identifying a state according to an embodiment of the disclosure. As shown in FIG. 9, steps S1024 to S1025 may be executed after the step S1021, which will be illustrated with reference to FIG. 9.

In step S1024, it is determined that a positional relation represents that there is a specific object region at least partially overlapping a region of interest, when a dimension scale of each specific object region is larger than the preset scale and the specific object region overlaps the region of interest.

When an electronic device obtains the dimension scale of each specific object region, if the dimension scale of a specific object region from the specific object regions is larger than the preset scale, and the specific object region completely overlaps or partially overlaps the region of interest, it may be determined that the positional relation between the region of interest and the specific object regions represents that there is a specific object region at least partially overlapping the region of interest. For example, as shown in FIG. 3B, the dimension scale of a specific object region D1 is larger than the preset scale and the specific object region D1 overlaps the region of interest A.

In step S1025, it is determined that a storage container is in an open state when the positional relation represents that there is a specific object region at least partially overlapping the region of interest.

The electronic device may determine that the storage container is in an open state, for example, the state shown in FIG. 3B, when it is determined that the positional relation between the region of interest and the specific object regions represents that there is a specific object region at least partially overlapping the region of interest.

According to some embodiments, an electronic device may determine that a specific object region overlaps a region of interest, when it is determined that a to-be-detected image includes specific objects, and that at least one vertex on any midline segment of the specific object region is positioned outside the region of interest, and that at least one point on any midline segment is positioned within the region of interest.

Herein, when it is determined that the detected image includes the specific objects, and one or more specific object regions are determined according to the positions of the specific objects, if one vertex on any midline segment of each specific object region is positioned outside the region of interest and at least one point on any midline segment is positioned within the region of interest, the electronic device may determine that the specific object region overlaps the region of interest. For example, as shown in FIG. 3B, part of the line segment of a vertical midline Z of a specific object region D1 is positioned in a region A and the other part is positioned outside the region A.

Figure 10:
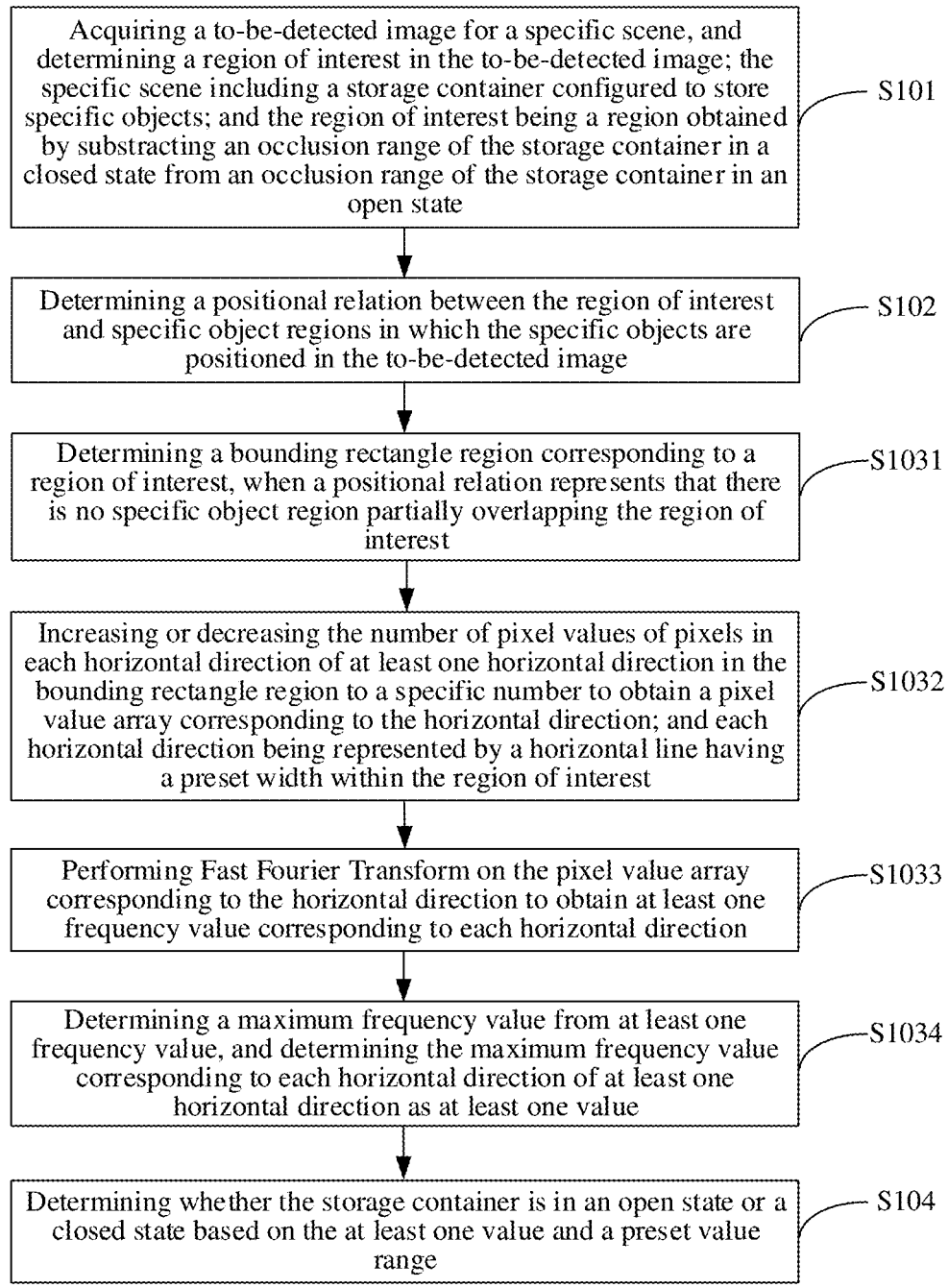
FIG. 10 illustrates an optional schematic flow diagram of a method for identifying a state according to an embodiment of the disclosure.

According to some embodiments, FIG. 10 illustrates an optional schematic flow diagram of a method for identifying a state according to an embodiment of the disclosure. As shown in FIG. 10, the step S103 may be implemented by steps S1031 to S1034, which will be illustrated according to the step S103 shown in FIG. 2 with reference to FIG. 10.

In step S1031, a bounding rectangle region corresponding to a region of interest is determined, when a positional relation represents that there is no specific object region partially overlapping the region of interest.

When the region of interest is determined, an electronic device may determine the bounding rectangle region corresponding to the region of interest according to all vertices of the region of interest. For example, when the region of interest is a parallelogram region, the electronic device may determine a bounding rectangle including at least the parallelogram to obtain the bounding rectangle region; and when the region of interest is a rectangle region, the electronic device may configure a rectangle region including at least the region of interest as a bounding rectangle region of the region of interest.

Illustratively, the bounding rectangle region corresponding to the region of interest may be a minimum bounding rectangle region, for example, the minimum bounding rectangle region may be a minimum bounding rectangle region of a parallelogram when the region of interest is a parallelogram region; and when the region of interest is a rectangle region, the region of interest may be configured as the minimum bounding rectangle region.

In step S1032, the number of pixel values of pixels in each horizontal direction of at least one horizontal direction in the bounding rectangle region is increased or decreased to a specific number to obtain a pixel value array corresponding to the horizontal direction. Here, each horizontal direction is represented by a horizontal line having a preset width within the region of interest.

When the bounding rectangle region is obtained, the electronic device may increase or decrease the number of pixel values in each horizontal direction of at least one horizontal direction represented by at least one horizontal line to a specific number, and all the increased or decreased pixel values are configured as the pixel values in the corresponding horizontal direction.

Figure 11:
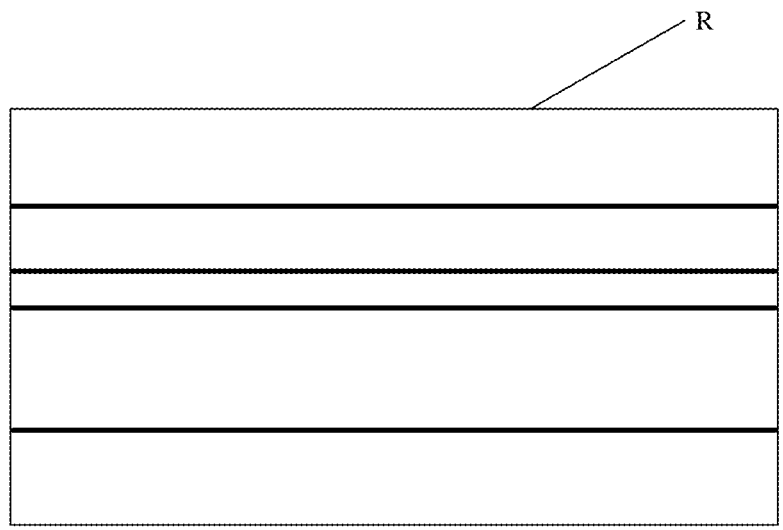
FIG. 11 illustrates a schematic diagram of four horizontal directions in a bounding rectangle region according to an embodiment of the disclosure.

Herein, the number of pixel values in each horizontal direction may be the number of pixel values in a horizontal line corresponding to the horizontal direction, and the number of pixel values in the horizontal line is proportional to the width of the horizontal line, which is not limited herein. Illustratively, as shown in FIG. 11, four horizontal lines with a preset width in a bounding rectangle region R represent four different horizontal directions.

According to the embodiments of the disclosure, the specific number may be an exponent of 2, for example, 1024, 2048, etc., which is not limited herein According to some embodiments, an electronic device may increase pixel values in each horizontal direction to a specific number by linear interpolation, for example, the number is increases from 1013 to 1024 or 2048, etc., and the pixel values in each horizontal direction may be decreased to a specific number by other methods such as deleting pixels, for example, the number is decreased from 1025 to 1024 and so on.

According to some embodiments, in order to improve the processing efficiency, an electronic device may first select multiple horizontal directions and increase or decrease the number of pixel values corresponding to each of the selected horizontal directions to a specific number. According to some embodiments, an electronic device may further increase or decrease the number of pixel values corresponding to each horizontal direction of all horizontal directions to a specific number in a bounding rectangle region.

According to some embodiments, an electronic device may determine a horizontal midline with a preset width of a bounding rectangle region and configure the middle horizontal direction represented by the horizontal midline as one of the at least one horizontal direction.

Figure 12:
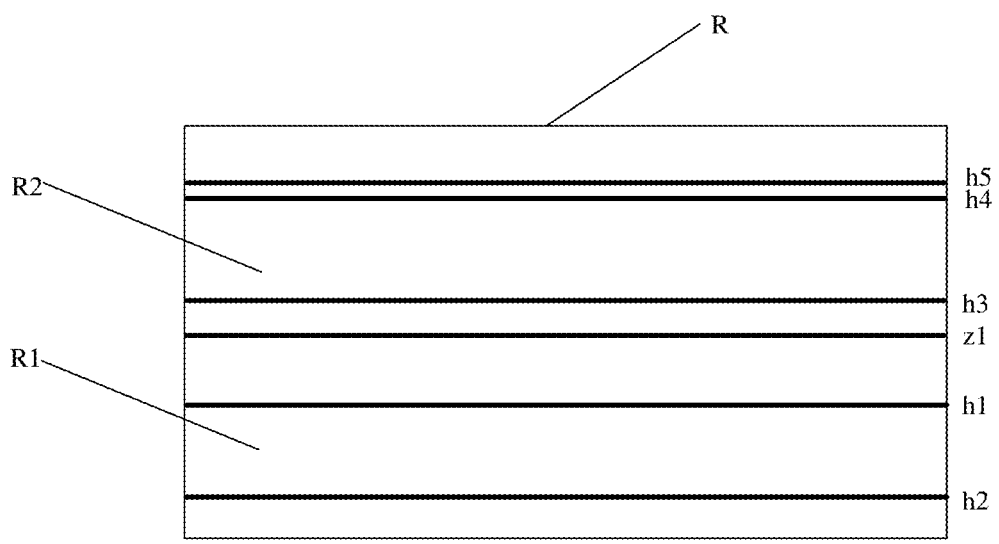
FIG. 12 illustrates a schematic diagram of six horizontal directions in a bounding rectangle region according to an embodiment of the disclosure.

Herein, the electronic device may first determine the horizontal midline of the bounding rectangle region, and then select multiple horizontal lines with a preset width from two regions divided by the horizontal midline to obtain multiple horizontal directions including the horizontal midline direction corresponding to multiple horizontal lines including the horizontal midline. Herein, the electronic device may respectively select at least one horizontal line having a preset width from the two regions at a preset width interval, or may randomly select at least one horizontal line having a preset width from the two regions, which is not limited herein. For example, as shown in FIG. 12, a bounding rectangle region R is divided into two regions, R1 and R2 with the same area by a horizontal midline z1 with a preset width. The electronic device may randomly select multiple horizontal lines with a preset width from R1 and R2 respectively. As shown in FIG. 12, two horizontal lines h1 and h2 are selected from R1 and three horizontal lines h3, h4 and h5 are selected from R2, therefore six horizontal directions corresponding to z1, h1, h2, h3, h4 and h5 may be obtained.

According to the embodiment of the disclosure, two endpoints of each horizontal line representing each horizontal direction are respectively correspondingly connected with two short sides of the bounding rectangle region, for example, as shown in FIG. 11 or FIG. 12. In addition, the widths of the horizontal lines may be the same or different.

According to some embodiments, an electronic device may select at least one horizontal line having a preset width from a bounding rectangle region at a preset width interval to obtain at least one horizontal direction represented by the at least one horizontal line.

Herein, the electronic device may further directly select one or more horizontal lines with a preset width from the bounding rectangle region at a preset width interval to correspondingly obtain at least one horizontal direction, for example, the electronic device may select 18 horizontal lines.

According to some embodiments, an electronic device may select a large number of horizontal lines with a preset width or all horizontal lines with a preset width in a bounding rectangle region, therefore at least one value obtained may be relatively accurate, which is beneficial to improving the accuracy of identifying a state of a storage container. According to some embodiments, an electronic device may further select a small number of horizontal lines with a preset width, therefore the efficiency of obtaining at least one value may be improved, which is beneficial to improving the efficiency of identifying a state of a storage container.

In step S1033, Fast Fourier Transform is performed on the pixel value array corresponding to the horizontal direction to obtain at least one frequency value corresponding to each horizontal direction.

The electronic device may perform Fast Fourier Transform on the pixel value array corresponding to the horizontal direction, and discard a first obtained frequency component from the processing results, and configure the rest frequency components as the at least one frequency value obtained.

In step S1034, a maximum frequency value is determined from at least one frequency value, and the maximum frequency value corresponding to each horizontal direction of at least one horizontal direction is determined as at least one value.

When the electronic device obtains at least one frequency value corresponding to the pixel value array corresponding to the horizontal direction, the value corresponding to the horizontal direction may be obtained by determining the maximum frequency value from at least one frequency value. Then, when there is at least one horizontal direction, the electronic device may obtain at least one value to determine the open and closed states of the storage container based on the at least one value obtained and a preset value range.

Figure 13:
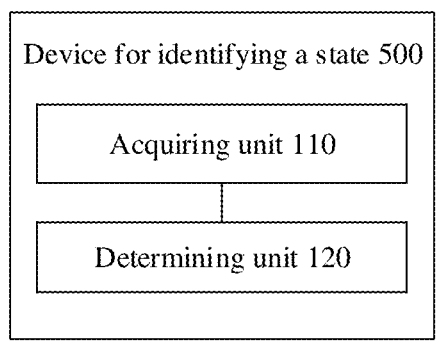
FIG. 13 illustrates a schematic structural diagram of a device for identifying a state according to an embodiment of the disclosure.

The disclosure further provides a device for identifying a state. FIG. 13 illustrates a schematic structural diagram of a device for identifying a state according to an embodiment of the disclosure. As shown in FIG. 13, the device for identifying the state 1 includes an acquiring unit 110 configured to acquire a to-be-detected image for a specific scene; and a determining unit 120 configured to determine a region of interest in the to-be-detected image, the specific scene including a storage container configured to store specific objects, and the region of interest being a region obtained by subtracting an occlusion range of the storage container in a closed state from an occlusion range of the storage container in an open state; to determine a positional relation between the region of interest and specific object regions in which the specific objects are positioned in the to-be-detected image; to determine at least one value based on pixel values of pixels in the region of interest when the positional relation represents that there is no specific object region partially overlapping the region of interest, each value representing the number of storage spaces in the storage container configured to place the specific objects; and to determine whether the storage container is in an open state or a closed state based on the at least one value and a preset value range.

According to some embodiments of the disclosure, a determining unit 120 is further configured to determine a target value from at least one value; and to determine open and closed states of a storage container based on the target value and a preset value range.

According to some embodiments of the disclosure, a determining unit 120 is further configured to determine that a storage container is in an open state when a target value falls within a preset value range; and/or to determine that the storage container is in a closed state when the target value does not fall within the preset value range.

According to some embodiments of the disclosure, a determining unit 120 is further configured to acquire a preset standard image of a specific scene, the preset standard image including a preset standard region; to determine a mapping relation between the preset standard image and the to-be-detected image; and to determine a region of interest mapped with the preset standard region in the to-be-detected image according to the mapping relation.

According to some embodiments of the disclosure, a determining unit 120 is further configured to determine multiple mapped boundary coordinate vertices according to a mapping relation and multiple boundary coordinate vertices of a preset standard region; and to determine a region of interest according to a region determined from the mapped boundary coordinate vertices.

According to some embodiments of the disclosure, a determining unit 120 is further configured to determine an average value based on at least one value and configure the average value as a target value.

According to some embodiments of the disclosure, a determining unit 120 is further configured to determine a bounding rectangle region corresponding to a region of interest; to increase or decrease the number of pixel values of pixels in each horizontal direction of at least one horizontal direction in the bounding rectangle region to a specific number to obtain an pixel value array corresponding to the horizontal direction, each horizontal direction being represented by a horizontal line having a preset width in the region of interest; to perform Fast Fourier Transform on the pixel value array corresponding to the horizontal direction to obtain at least one frequency value corresponding to each horizontal direction; and to determine a maximum frequency value from the at least one frequency value, and determine the maximum frequency value corresponding to each horizontal direction of the at least one horizontal direction as at least one value.

According to some embodiments of the disclosure, a determining unit 120 is further configured to determine a dimension scale of each specific object region when a region of interest of a to-be-detected image includes specific object; to determine that a positional relation represents that there is no specific object region partially overlapping the region of interest, when the dimension scale is smaller than or equal to a preset scale; or to determine that the positional relation represents that there is no specific object region partially overlapping the region of interest, when the region of interest does not include the specific objects.

According to some embodiments of the disclosure, a determining unit 120 is further configured to determine that a positional relation represents that there is a specific object region at least partially overlapping a region of interest when a dimension scale of the specific object region is larger than a preset scale and the specific object region overlaps the region of interest; and to determine that a storage container is in an open state, when the positional relation represents that there is a specific object region at least partially overlapping the region of interest.

According to some embodiments of the disclosure, a determining unit 120 is further configured to determine that a specific object region overlaps a region of interest, when a to-be-detected image includes specific objects, and at least one vertex on any midline segment of the specific object region is positioned outside the region of interest, and at least one point on any midline segment is positioned within the region of interest.

Figure 14:
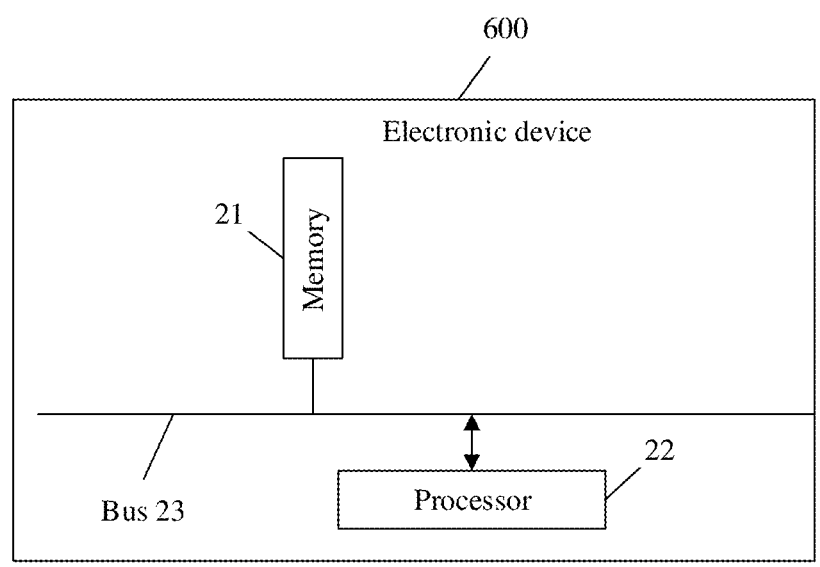
FIG. 14 illustrates a schematic structural diagram of an electronic device according to an embodiment of the disclosure.

An embodiment of the disclosure further provides an electronic device. FIG. 14 illustrates a schematic structural diagram of a virtual label display device according to an embodiment of the disclosure. As shown in FIG. 14, the electronic device includes a memory 21 and a processor 22, and the memory 21 and the processor 22 are connected through a bus 23. The memory 21 is configured to store an executable computer program; and the processor 22 is configured to implement a method according to an embodiment of the disclosure, for example, a method for identifying a state according to an embodiment of the disclosure, when executing the executable computer program stored in the memory 21.

An embodiment of the disclosure provides a computer-readable storage medium configured to store a computer program, which enables a processor 22 to execute and implement a method according to an embodiment of the disclosure, for example, a method for identifying a state according to an embodiment of the disclosure.

According to some embodiments of the disclosure, a storage medium may be implemented as a memory device such as FRAM, ROM, PROM, EPROM, EEPROM, flash memory, magnetic platter memory, CD, or CD-ROM, and may further be implemented as various devices including one or any combination of the memory devices described above.

According to some embodiments of the disclosure, executable instructions may be configured in form of programs, software, software modules, scripts or codes, written in any form of programming language (such as compiler or interpreter language, or declarative or procedural language), which may be deployed in any form, including being deployed as a stand-alone program or as a module, component, subroutine, or other unit suitable for use in a computing environment.

Illustratively, the executable instructions may, but do not necessarily, correspond to files in a file system, and may be stored in part of a file saves other programs or data, for example, in one or more scripts stored in an HTML (Hyper Text Markup Language) document, in a single file special for the program discussed, or in multiple collaborative files (for example, files storing one or more modules, subroutines, or codes).

Illustratively, the executable instructions may be deployed for execution on a computing device, or on multiple computing devices positioned at one place, or on multiple computing devices distributed at multiple places and interconnected through a communication network.

To sum up, according to the technical schemes of the disclosure, by acquiring a to-be-detected image for a specific scene including a storage container configured to store specific objects, determining an region of interest in the to-be-detected image, and the region of interest being a region obtained by subtracting an occlusion range of the storage container in a closed state from an occlusion range of the storage container in an open state, determining a positional relation between the region of interest and specific object regions in which the specific objects are positioned in the to-be-detected image, determining at least one value according to pixel values of pixels in the region of interest when the positional relation represents that there is no specific object region partially overlapping the region of interest, and each value representing the number of storage spaces configured to place specific objects in the storage container, and finally determining whether the storage container is in an open state or a closed state based on at least one value and a preset value range, the disclosure provides a new mode for detecting the open state or closed state of the storage container, and improves the flexibility of determining the open and closed states of the storage container.

The foregoing merely illustrates the embodiments of the disclosure, but the scope of the disclosure is not limited thereto. Variations, substitutions and improvements shall fall within the scope of the disclosure without departing from the spirit and scope of the disclosure.

The invention claimed is:

1. A method for identifying a state, comprising:
   acquiring a to-be-detected image for a specific scene, and determining a region of interest in the to-be-detected image, wherein the specific scene comprises a storage container configured to store specific objects; and the region of interest is a region obtained by subtracting an occlusion range of the storage container in a closed state from an occlusion range of the storage container in an open state;
   determining a positional relation between the region of interest and specific object regions in which the specific objects are positioned in the to-be-detected image;
   determining at least one value based on pixel values of pixels in the region of interest when the positional relation represents that there is no specific object region partially overlapping the region of interest, wherein each value represents a number of storage spaces in the storage container configured to place the specific objects; and
   determining whether the storage container is in the open state or the closed state based on the at least one value and a preset value range.

2. The method of claim 1, wherein the step of determining whether the storage container is in the open state or the closed state based on the at least one value and the preset value range comprises:
   determining a target value from the at least one value; and
   determining whether the storage container is in the open state or the closed state based on the target value and the preset value range.

3. The method of claim 2, wherein the step of determining whether the storage container is in the open state or the closed state based on the target value and the preset value range comprises at least one of:
   determining that the storage container is in the open state, when the target value falls within the preset value range; or
   determining that the storage container is in the closed state, when the target value does not fall within the preset value range.

4. The method of claim 1, wherein the step of determining the region of interest in the to-be-detected image comprises:
   acquiring a preset standard image of the specific scene, wherein the preset standard image comprises a preset standard region;
   determining a mapping relation between the preset standard image and the to-be-detected image; and
   determining the region of interest mapped with the preset standard region in the to-be-detected image according to the mapping relation.

5. The method of claim 4, wherein the step of determining the region of interest mapped with the preset standard region in the to-be-detected image according to the mapping relation comprises:
   determining multiple mapped boundary coordinate vertices according to the mapping relation and multiple boundary coordinate vertices of the preset standard region; and
   determining the region of interest according to a region determined from the mapped boundary coordinate vertices.

6. The method of claim 2, wherein the step of determining the target value from the at least one value comprises:
   determining an average value based on the at least one value, and determining the average value as the target value.

7. The method of claim 1, wherein the step of determining the at least one value based on the pixel values of the pixels in the region of interest comprises:
   determining a bounding rectangle region corresponding to the region of interest;
   increasing or decreasing a number of the pixel values of pixels in each horizontal direction of at least one horizontal direction in the bounding rectangle region to a specific number to obtain a pixel value array corresponding to the horizontal direction, wherein each horizontal direction is represented by a horizontal line having a preset width in the region of interest;
   performing Fast Fourier Transform on the pixel value array corresponding to the horizontal direction to obtain at least one frequency value corresponding to each horizontal direction; and determining a maximum frequency value from the at least one frequency value, and determining the maximum frequency value corresponding to each horizontal direction of the at least one horizontal direction as the at least one value.

8. The method of claim 1, wherein the step of determining the positional relation between the region of interest and the specific object regions in which the specific objects are positioned in the to-be-detected image comprises at least one of:

determining a dimension scale of the specific object region when the region of interest of the to-be-detected image comprises the specific objects; and determining that the positional relation represents that there is no specific object region partially overlapping the region of interest when the dimension scale is smaller than or equal to a preset scale; or determining the positional relation represents that there is no specific object region partially overlapping the region of interest when the region of interest does not comprise the specific objects.

9. The method of claim 8, wherein, after determining the dimension scale of each specific object region, the method further comprises:

determining that the positional relation represents that there is a specific object region at least partially overlapping the region of interest when the dimension scale of the specific object region is larger than the preset scale and the specific object region overlaps the region of interest; and determining that the storage container is in the open state when the positional relation represents that there is a specific object region at least partially overlapping the region of interest.

10. The method of claim 9, further comprising:

when the to-be-detected image comprises the specific objects, and at least one vertex on any midline segment of the specific object region is positioned outside the region of interest, and at least one point on any midline segment is positioned within the region of interest, determining that the specific object region overlaps the region of interest.

11. A device for identifying a state, comprising:

a memory for storing instructions; and a processor, wherein the processor is configured to execute the instructions to:

acquire a to-be-detected image for a specific scene; and determine a region of interest in the to-be-detected image, wherein the specific scene comprises a storage container configured to store specific objects, and the region of interest is a region obtained by subtracting an occlusion range of the storage container in a closed state from an occlusion range of the storage container in an open state; determine a positional relation between the region of interest and specific object regions in which the specific objects are positioned in the to-be-detected image; determine at least one value based on pixel values of pixels in the region of interest when the positional relation represents that there is no specific object region partially overlapping the region of interest, wherein each value represents a number of storage spaces in the storage container configured to place the specific objects; and determine whether the storage container is in the open state or the closed state based on the at least one value and a preset value range.

12. The device of claim 11, wherein the processor is configured to execute the instructions to:

determine a target value from the at least one value; and determine whether the storage container is in the open state or the closed state based on the target value and the preset value range.

13. The device of claim 12, wherein the processor is configured to execute the instructions to at least one of:

determine that the storage container is in the open state, when the target value falls within the preset value range; or determine that the storage container is in the closed state, when the target value does not fall within the preset value range.

14. The device of claim 11, wherein the processor is configured to execute the instructions to:

acquire a preset standard image of the specific scene, wherein the preset standard image comprises a preset standard region;

determine a mapping relation between the preset standard image and the to-be-detected image; and determine the region of interest mapped with the preset standard region in the to-be-detected image according to the mapping relation.

15. The device of claim 14, wherein the processor is configured to execute the instructions to:

determine multiple mapped boundary coordinate vertices according to the mapping relation and multiple boundary coordinate vertices of the preset standard region; and determine the region of interest according to a region determined from the mapped boundary coordinate vertices.

16. The device of claim 12, wherein the processor is configured to execute the instructions to:

determine an average value based on the at least one value, and determining the average value as the target value.

17. The device of claim 11, wherein the processor is configured to execute the instructions to:

determine a bounding rectangle region corresponding to the region of interest;

increase or decrease a number of the pixel values of pixels in each horizontal direction of at least one horizontal direction in the bounding rectangle region to a specific number to obtain a pixel value array corresponding to the horizontal direction, wherein each horizontal direction is represented by a horizontal line having a preset width in the region of interest;

perform Fast Fourier Transform on the pixel value array corresponding to the horizontal direction to obtain at least one frequency value corresponding to each horizontal direction; and determine a maximum frequency value from the at least one frequency value, and determine the maximum frequency value corresponding to each horizontal direction of the at least one horizontal direction as the at least one value.

18. The device of claim 11, wherein the processor is configured to execute the instructions to at least one of:

determine a dimension scale of the specific object region when the region of interest of the to-be-detected image comprises the specific objects; and determine that the positional relation represents that there is no specific object region partially overlapping the region of interest when the dimension scale is smaller than or equal to a preset scale; or determine the positional relation represents that there is no specific object region partially overlapping the region of interest when the region of interest does not comprise the specific objects.

19. A non-transitory computer-readable storage medium having stored thereon a computer program that when executed by a processor, implements a method for identifying a state, the method comprising:

acquiring a to-be-detected image for a specific scene, and determining a region of interest in the to-be-detected image, wherein the specific scene comprises a storage container configured to store specific objects; and the region of interest is a region obtained by subtracting an occlusion range of the storage container in a closed state from an occlusion range of the storage container in an open state;

determining a positional relation between the region of interest and specific object regions in which the specific objects are positioned in the to-be-detected image;

determining at least one value based on pixel values of pixels in the region of interest when the positional relation represents that there is no specific object region partially overlapping the region of interest, wherein each value represents a number of storage spaces in the storage container configured to place the specific objects; and determining whether the storage container is in the open state or the closed state based on the at least one value and a preset value range.

* * * * *